US009777221B2

(12) United States Patent
Miller et al.

(10) Patent No.: US 9,777,221 B2
(45) Date of Patent: Oct. 3, 2017

(54) METHOD OF PRODUCING NEEDLE COKE FOR LOW CTE GRAPHITE ELECTRODES

(75) Inventors: Douglas J. Miller, North Olmsted, OH (US); Irwin C. Lewis, Strongsville, OH (US); Ching-Feng Chang, Strongsville, OH (US); Richard Thomas Lewis, Auburn, OH (US)

(73) Assignee: GrafTech International Holdings Inc., Brooklyn Heights, OH (US)

( * ) Notice: Subject to any disclaimer, the term of this patent is extended or adjusted under 35 U.S.C. 154(b) by 1373 days.

(21) Appl. No.: 11/427,786

(22) Filed: Jun. 29, 2006

(65) Prior Publication Data

US 2008/0003167 A1    Jan. 3, 2008

(51) Int. Cl.
| | |
|---|---|
| *C10B 55/00* | (2006.01) |
| *C04B 35/52* | (2006.01) |
| *C04B 35/532* | (2006.01) |
| *C04B 35/626* | (2006.01) |
| *C04B 35/83* | (2006.01) |
| *C10B 57/04* | (2006.01) |
| *C10C 1/04* | (2006.01) |
| *C10L 9/08* | (2006.01) |
| *F27D 11/08* | (2006.01) |

(52) U.S. Cl.
CPC ............ *C10B 55/00* (2013.01); *C04B 35/522* (2013.01); *C04B 35/532* (2013.01); *C04B 35/6267* (2013.01); *C04B 35/83* (2013.01); *C10B 57/045* (2013.01); *C10C 1/04* (2013.01); *C10L 9/08* (2013.01); *F27D 11/08* (2013.01); *C04B 2235/5248* (2013.01); *C04B 2235/5276* (2013.01); *C04B 2235/6021* (2013.01); *C04B 2235/656* (2013.01); *C04B 2235/722* (2013.01); *C04B 2235/726* (2013.01); *C04B 2235/9607* (2013.01)

(58) Field of Classification Search
None
See application file for complete search history.

(56) References Cited

U.S. PATENT DOCUMENTS

| | | | | |
|---|---|---|---|---|
| 3,799,865 | A | * | 3/1974 | Suetsugu et al. ............. 208/131 |
| 4,029,749 | A | * | 6/1977 | Murakami .................... 423/460 |
| 4,289,604 | A | * | 9/1981 | Kolling et al. ............... 208/106 |
| 4,312,745 | A | | 1/1982 | Hsu et al. |
| 4,317,809 | A | | 3/1982 | Lewis et al. ............... 423/447.1 |
| 4,448,670 | A | | 5/1984 | Dickakian ........................ 208/22 |
| 4,624,775 | A | * | 11/1986 | Dickinson ............. C10B 57/045 208/131 |
| 4,814,063 | A | * | 3/1989 | Murakami et al. ............. 208/50 |
| 5,143,689 | A | | 9/1992 | Hauser et al. |
| 5,286,371 | A | * | 2/1994 | Goval et al. .................. 208/131 |
| 5,695,631 | A | | 12/1997 | Eguchi et al. .................. 208/50 |
| 2005/0284793 | A1 | | 12/2005 | Bhattacharyya et al. |

FOREIGN PATENT DOCUMENTS

| | | |
|---|---|---|
| JP | 51-62804 | 5/1976 |
| JP | 62-041285 | 2/1987 |
| JP | 05-163491 | 6/1993 |
| JP | 2003-183669 | 3/2003 |

OTHER PUBLICATIONS

Ogawa et al.; Influence of Grinding on the Graduation Graphitization and Densification of Coke Powder; Journal of Material Science; 16, 2181-2187; 1981.*
German Patent No. DE 3347352 by Nippon Steel Chemical Co., Ltd., Tokyo, JP.
Japanese Patent No. JP1985263700.
G. Wagoner et al., Carbon Conference 1986 Proceedings, pp. 234, Baden-Baden, 1986.
U.S. Appl. No. 11/444,917, filed May 31, 2006, by Douglas J. Miller (now abandoned).

* cited by examiner

*Primary Examiner* — Guinever S Gregorio

(57) ABSTRACT

A method of producing low CTE graphite electrodes from needle coke formed from a coal tar distillate material having a relatively high initial boiling point.

15 Claims, No Drawings

METHOD OF PRODUCING NEEDLE COKE FOR LOW CTE GRAPHITE ELECTRODES

GOVERNMENT INTERESTS

This invention was made with the support of the U.S. Department of Energy, under Award No. DE-FC26-03NT41874. The Government has certain rights in the invention. However, any opinions, findings, conclusions, or recommendations expressed herein are those of the inventors and do not necessarily reflect the view of the DOE.

BACKGROUND OF THE INVENTION

Technical Field

The present invention relates to needle coke useful for applications including producing graphite electrodes. More particularly, the present invention relates to a process for producing needle coke from a coal tar distillate as a starting material for graphite electrodes which exhibit a reduced coefficient of thermal expansion.

Background Art

Carbon electrodes, especially graphite electrodes, are used in the steel industry to melt both metals and supplemental ingredients used to form steel in electro-thermal furnaces. The heat needed to melt the substrate metal is generated by passing a current through at least one and, more commonly, a plurality of electrodes and forming an arc between the electrodes and the metal. Currents in excess of 100,000 amperes are often used.

Electrodes are typically manufactured using a needle coke filler combined with a pitch binder. Needle coke is a grade of coke having an acicular, anisotropic microstructure. For creating graphite electrodes that can withstand the ultra-high power throughput, the needle coke must have a low electrical resistivity and a low coefficient of thermal expansion (CTE) while also being able to produce a relatively high-strength article upon graphitization. The CTE value assigned to a needle coke is conventionally determined by admixing the milled, calcined coke with a pitch binder, extruding the coke/pitch blend to form an electrode, followed by heat treatment of the electrode to about 3000° C. to graphitize the electrode. The CTE value is then measured on the graphitized electrode.

The specific properties of the needle coke are determined by the choice of feedstock and the control of parameters in the coking process in which an appropriate carbon feedstock is converted into needle coke. Typically, the classification of needle coke is through a system of grade levels, which are distinguished as a function of the CTE over a certain temperature range. For example, premium needle coke is usually classified as having an average CTE of less than about $1.00 \times 10^{-6}/°$ C. over the temperature range of from about 100° C. to about 400° C. while regular grade needle coke has an average CTE of from about $1.00 \times 10^{-6}/°$ C. to about $1.25 \times 10^{-6}/°$ C. over the temperature range of from about 100° C. to about 400° C. The CTE value of the graphitized electrode produced with the coke filler is measured in the extruded (i.e., longitudinal) direction using either a dilatomer or the capacitance method as described in G. Wagoner et al., Carbon Conference 1986 Proceedings, pp. 234, Baden-Baden, 1986.

To convert the needle coke to graphite, the article containing the needle coke (e.g., the electrode) should be heated generally in a range of from about 2000° C. to about 3500° C. to convert the needle coke to a graphitic crystalline structure while eliminating volatilizing impurities. Such impurities negatively increase the CTE of a formed graphite electrode, and can result in electrode expansion as current is applied. The expansion will alter the arcing properties of the electrode either rendering the process less efficient or possibly resulting in electrode breakage.

Low CTE needle coke suitable for high performance graphite electrodes is largely produced from petroleum-derived feedstocks. For this purpose, the feedstock should be highly aromatic, provide a good carbon yield after coking, and be very low in ash and infusible solids. Typically in a production of petroleum needle coke, fluid catalytic cracking (FCC) decant oil is used as a starting material which contains about 0.02% to about 0.04% by weight of ash. The major constituent of ash is FCC catalyst remaining from the original cracking of the decant oil. This FCC catalyst increases the thermal expansion characteristics of a resulting electrode, thereby necessitating the removal of the catalyst for production of low CTE graphite electrodes from petroleum needle coke. As a result, many individuals have developed methods for removing the ash particles so as to decrease the CTE of the resulting electrode. For example, in U.S. Pat. No. 5,695,631, Eguchi et al. discloses a method for producing petroleum needle coke which includes filtration, centrifugation, and/or electrostatic aggregation to remove a substantial portion of the FCC catalyst from the decant oil.

While the use of petroleum-based needle coke can result in the formation of a graphite electrode with a lower CTE, there are significant disadvantages to using petroleum-based needle coke. One such disadvantage is the potential shortage of petroleum-derived needle coke as the price of petroleum continues to rise. Furthermore, there are few and limited suppliers of petroleum needle coke suitable for the creation of low CTE graphite electrodes. Additionally, the cost of petroleum needle coke is pushed even higher due to the required filtration to remove a significant portion of ash from the decant oil.

A different approach is to use coal-based feedstocks in providing needle coke for graphite electrodes. In this process, coal tar is derived from the coking process used to produce metallurgical coke from coal. The coal tar is obtained as the overhead product and contains infusible carbonaceous solids formed by gas-based carbonization and also as a result of coal carryover. These remaining solids interfere with the development of a large domain mesophase when forming needle coke and instead result in the formation of a high CTE coke.

Despite these solids, coal tar would be a desirable starting material for producing coke because coal tar is highly aromatic and has a high carbon yield. Coal tar generally has carbon yields of from about 10% to about 30% as determined by a modified Conradson carbon (MCC) test. However, in order to obtain a low CTE coke from coal tar, a physical solid separations process must be employed to remove undesirable solids which constitute up to 10% of the tar.

Examples in which solids have been removed from coal tar for the preparation of needle coke include Japanese Patent No. JP19850263700, Misao et al, in which quinoline-insoluble components are removed from coal tar and/or coal tar pitch for the use in delayed coking to produce needle coke.

In Masayoshi et al. (German Patent No. DE3347352), a process is described for producing needle coke in which hydrogenation is used to remove solid components from the coal tar. Specifically, coal tar and/or coal tar pitch raw material, is purified by hydrogenation in the presence of a hydrogenation catalyst until a denitrification ratio of at least 15% by weight is reached.

Unfortunately coal tar-based needle coke produced by the prior art includes steps which are costly while also creating the issue of disposing the mixture of residual tar and the separated solids. The use of a variety of different catalysts for the removable of solid components of coal tar can create waste products which cause both economic concerns and also environmental issues which factor into the cost of utilizing coal tar for the production of low CTE needle coke. Furthermore, many prior art processes require significant energy input as high temperatures are often necessary for the catalyst to remove a substantial amount of solids from the feedstock. Furthermore, when the hydrogenation catalyst is utilized in removing solid components from the coal tar, a constant stream of hydrogen is necessary for the reactive process to function. Such a hydrogenation process also lowers the overall coke yield of the feedstock by reducing aromaticity.

Rather than utilizing coal tar, processes have developed which utilize coal tar distillates to produce mesophase pitch. Lewis et al., U.S. Pat. No. 4,317,809, describe a process in which a coal tar distillate is heated at 750 psig for 5 hours at 450° C. to form a mesophase pitch. The overall yield of mesophase pitch is lower than desired, and the pressure utilized is considered too high for use in a commercial delayed coking process which generally operates below about 100 psig.

What is desired, therefore, is a process for producing needle coke for low CTE graphite electrodes which does not require the use of a petroleum-derived feedstock, and therefore, would not contain ash which increases the CTE of the resulting graphite electrode. Furthermore, a process is desired which eliminates the infusible carbonaceous solids which are present in coal tar and require removal for the production of a low CTE graphite electrode from coal tar. Indeed it would be desirable to have a process for directly converting the coal-based precursor to highly anisotropic needle coke without the need for a solid separation process which could also be readily adaptable to commercial delayed coking processes. It would also be desirable to have a process which results in a high coke yield while using lower pressures than are currently standard to commercial refinery coking operations.

SUMMARY OF THE INVENTION

The present invention provides a process which is uniquely capable of economically producing a graphite electrode with a low coefficient of thermal expansion from coal tar distillate-based needle coke. The inventive process provides a method where neither additives nor high temperature hydrogenation steps are necessary to remove solid CTE-increasing elements from the feedstock in the process of making needle coke. Such created needle coke resists expansion upon heating and provides graphite electrode articles with improved thermal stability and a reduced CTE, a combination of needle coke characteristics not heretofore seen. In addition, the inventive process for producing needle coke provides a low CTE needle coke from coal tar distillate without the excessive expenditures of both hydrogen and thermal energy, or using extremely high pressures.

More particularly, the inventive process utilizes a feedstock of coal tar distillate with a relatively high boiling range. The initial atmospheric boiling point of the coal tar distillate used in the inventive process is greater than about 280° C. Such high boiling point coal tar distillate should have an MCC value of at least about 1% and up to about 3% or higher. The initial boiling point of the coal tar distillate can be determined by use of a modified thermogravimetric analysis (TGA) method, in accordance with ASTM E 2008.

The inventive process for creating low CTE graphite electrodes from coal tar distillate-based needle coke should be operated under a moderate pressure typically to that used in conventional delayed coking processes. Specifically, the coal tar distillate feedstock should be heated under pressure with the pressure at least about 20 psig, preferably in the range of from about 30 psig to about 100 psig. Higher pressures can be employed, but would require more expensive coking vessels. Lower pressures would reduce the yield of coke obtained from the coal tar distillate.

The inventive process for producing needle coke from coal tar distillate feedstock for the production of low CTE graphite electrodes can be operated without the addition of excess thermal energy or hydrogen gas or multiple catalysts. The coal tar distillate feedstock contains significantly less solids than a coal tar feedstock; indeed, it is essentially free of solids as compared to a coal tar feedstock. Thus, it will not require the removal of solids to achieve a needle coke with a low CTE. Furthermore, converse to needle coke created from a petroleum feedstock, the inventive process does not contain leftover FCC catalyst or other ash components which first must be removed in order to produce a low CTE needle coke.

In addition, it has been found highly advantageous that the inventive process produces a relatively high yield of raw coke from the coal tar distillate feedstock using a relatively moderate pressure. Specifically, this yield of raw coke can be of from about 60% to about 90% of the coal tar distillate. This is significantly higher than the 30% to 50% yield obtained from petroleum-derived decant when coked at comparable pressures The coal tar distillate feedstock is fed into a delayed coking unit for the production of needle coke. Delayed coking, as known in the art, is the thermal cracking process in which the liquid coal tar distillate feedstock is converted into the solid needle coke. In one embodiment, the delayed coking process of producing needle coke from the coal tar distillate feedstock is a batch continuous process where multiple needle coke drums are utilized so that one drum is always being filled with coal tar distillate feedstock while one drum is being emptied. The total yield of needle coke created from a coal tar distillate feedstock can be expected to be in the range of from about 55% to about 85% of the initial coal tar distillate feedstock.

An object of the invention, therefore, is a process for creating low CTE graphite electrodes.

Another object of the invention is a process for creating needle coke which can be extruded so as to create a low CTE graphite electrode.

Still another object of the invention is a process for creating a low CTE needle coke from a coal tar distillate feedstock.

Yet another object of the invention is the process in which a coal tar distillate feedstock with a relatively high boiling point is utilized to create a low CTE needle coke.

These aspects and others that will become apparent to the artisan upon review of the following description can be accomplished by providing a coal tar distillate feedstock having an average initial boiling point of greater than about 280° C. and then coking the coal tar distillate feedstock under pressure to produce needle coke. The inventive process advantageously produces needle coke from a coal tar distillate feedstock which can be used to produce a graphite electrode with a CTE of from about 0.005 ppm/° C. to about 0.150 ppm/° C.

Furthermore, the inventive process can utilize standard commercial delay coking process equipment.

It is to be understood that both the foregoing general description and the following detailed description provide embodiments of the invention and are intended to provide an overview or framework of understanding to nature and character of the invention as it is claimed.

DETAILED DESCRIPTION OF THE PREFERRED EMBODIMENT

The coal tar distillate used as a starting material for the creation of the low CTE needle coke through this inventive process is obtained through the distillation of coal tar. Coal tar is derived from the coking process used to produce metallurgical coke from coal. Moreover, the production of coal tar from coal is a high-temperature destructive distillation process by which bituminous coal is transformed into both coke and coal tar.

The coal tar which is obtained as the overhead product from the destructive distillation of coal contains infusible carbonaceous solids which are formed either by the gas phase carbonization or as a result of coal carryover. Furthermore, in subsequent distillations, where coal tar undergoes distillation, alkaline materials are typically added to the coal tar to preclude corrosion.

In the distillation of coal tars, the coal tar is separated into at least two products, the heavy product being the coal tar pitch residues with the overhead product being the coal tar distillate. In one embodiment of the distillation of coal tar, multiple distillation columns are utilized for the separation of the coal tar into coal tar pitch and coal tar distillates with different boiling ranges.

The resulting coal tar pitch residue and coal tar distillates can have an extremely wide range of boiling point characteristics dependent upon the distillation process, the process conditions, as well as the starting coal tar material. The low boiling distillates which contain one and two ring aromatics are generally separated to provide chemicals such as benzenes and naphthalene, while the higher boiling distillates have limited use.

Similar to aromatic residues created through the cracking of a petroleum feedstock, the coal tar distillates derived from the distillation of coal tar contain a high proportion of polycondensed aromatics. Specifically, the coal tar distillate has a carbon weight percentage of from about 85% to about 95% and a hydrogen weight percentage of from about 3% to about 8%. Other elemental components of coal tar distillate include nitrogen, oxygen, sulfur, and sodium. The coal tar distillates are more aromatic and contain less alkyl side chains than petroleum feedstocks. Further chemical details of coal tar distillate are described in U.S. Pat. No. 4,448,670 entitled "Aromatic Pitch Production from Coal-Derived Distillate" which is hereby incorporated by reference.

The first step in producing coal tar distillate-based needle coke for the production of low CTE graphite electrodes is the selection of a coal tar distillate with a relatively high initial boiling point. The boil point of the coal tar distillate should be greater than about 280° C. Furthermore, the relatively high boiling point coal tar distillate should have a coking value of at least 1% as determined by an MCC.

After selecting a relatively high boiling point coal tar distillate, the coal tar distillate undergoes a carbonization step in which both pressure and temperature are applied. The distillate material is heated to a temperature of from about 450° C. to about 525° C. with the temperature preferably around 475° C. This temperature is achieved by heating the distillate in a batch coking operation through a stepwise increase in the temperature of the coal tar distillate at a rate of from about 35° C. per hour to about 65° C. per hour with the rate of temperature increase preferably being at about 50° C. per hour. Once the aforementioned temperature of the distillate material is achieved, the coal tar distillate is maintained at that temperature for about 16 hours to about 25 hours in the coking vessel. The longer times are needed at the lower specified temperatures to assure the conversion of the entire distillate to coke. Alternatively, the coal tar distillate can be fed continuously into a coking vessel maintained at a temperature of 450° C. to about 525° C. and then held at that temperature for at least 3 hours to complete the coking process.

Additionally, during the carbonization step of the coal tar distillate material, the inventive process includes the use of moderate pressures, ranging from about 20 psig to about 100 psig. Optimally, the system pressure is maintained at about 50 psig. Without the use of these pressures, the distillate components will volatilize, thus generally reducing the coke yield.

The carbonization step results in the transformation of the coal tar distillate material into a material which is referred to as either green coke or raw coke. This green coke has a black mass-like appearance with visible pores resulting from the evolution of volatile gases during the carbonization step. With this process, the yield of green coke is from about 60% to about 90% of the initial high boiling point coal tar distillate supplied for the carbonization step.

After the carbonization and before the calcination, the green coke can be crushed to increase the surface area of the coke and thereby decrease the necessary time for calcination.

The calcination step is conducted at a significantly higher temperature than the previous carbonization step. This step includes heating the crushed raw coke at a temperature of from about 1300° C. to about 1500° C., more preferably from about 1400° C. to about 1450° C. In this step, the hydrogen as well as a significant portion of the nitrogen and sulfur in the coke is removed and the coke is converted to a carbon structure. Furthermore, this set temperature is achieved in a batch operation through a step-wise increase in temperature of the raw coke at a rate of from about 300° C. per hour to about 400° C. per hour ideally at a rate of about 350° C. per hour. For commercial processing, the raw coke can be fed continuously into a calciner where the temperature is raised in stages to reach the final value.

The resulting product from this inventive process is a low CTE needle coke which possesses anisotropic properties making it ideally suited for the production of low CTE graphite electrodes. With this process, the yield of needle coke can be as high as about 95% of the raw coke produced by the carbonization step, and is generally at least about 80%, even 90%. The final production yield of the inventive process is of from about 55% to about 85% of the initial coal tar distillate fed into the process.

Because of the operating conditions of pressure and temperature, the inventive process can be wholly applied to existing delayed coking processing equipment precluding the need for additional facilities or equipment. Typical delayed coking operations operate in a batch-continuous process with the feed stream being switched between at least two different coking drums. Most often one drum is online being filled with feedstock while the other drum is being prepared for the input of feedstock. As known to one skilled in the art of delayed coking, the regular switching between multiple coking drums creates a cycle of different events which occur on a regular interval resulting in a repeatable set of process conditions.

The low CTE needle coke produced from the inventive process can be utilized directly for certain applications or it can be used for the creation of a graphite electrode. The needle coke is first milled to produce particles and a flour, which are then hot mixed with of from about 15% to about 35% by weight of coal tar binder pitch. This mix is then extruded at a temperature of from about 90° C. to about 120° C. to form a green electrode. By heating the hot mix of coal tar binder pitch and milled needle coke, the particles in the pitch melt causing the hot mixture to become fluid, and thus, susceptible to shaping by either extrusion, molding, or other formation techniques.

The green electrode is then baked at a temperature of from about 800° C. to about 900° C. to carbonize the coal tar binder pitch element of the green electrode. The baking of the green electrode drives off volatile materials contained within the binder pitch material so that the resulting electrode will have a more uniform internal structure.

The baked electrode is then graphitized by heating to a temperature of from about 2700° C. to about 3300° C. with a preferred temperature of about 3000° C. The total graphitization time can be as short as a few hours or as long as several days depending upon both the size and application of the graphite electrode.

The resulting graphite electrode produced by this inventive process has a relatively low CTE. Specifically, by using the capacitance method as described in G. Wagoner et al., Carbon Conference 1986 Proceedings, pp. 234, Baden-Baden, 1986, the electrode resulting from the inventive process will have a coefficient of thermal expansion of from about 0.005 ppm/° C. to about 0.150/° C.

In order to further illustrate the principles and operation of the present invention, the following examples are provided. However, these examples should not be taken as limited in any regard.

Example 1

A coal tar distillate with an initial boiling point of 312° C. is used as a coke precursor. The initial boiling point is determined using a modified TGA method from ASTM E 2008. The MCC value of the distillate is measured as 1.2%. The distillate material, contained in a loosely covered stainless steel vessel, is heat treated in an autoclave maintained at 50 psig. The material is heated at a rate of 50° C. per hour to 475° C. and then held at that temperature for 20 hours. A very high yield of 75% raw coke is obtained.

The raw coke is then crushed and calcined by heating in an inert atmosphere in a tube furnace at a rate of about 350° C./hour to 1420° C. and then is held at that temperature for 30 minutes. The yield of calcined coke is 92% so the overall production yield based on the original distillate is 73%.

In order to determine the CTE value, the coke is milled to a flour and then hot-mixed with about 25% by weight of a conventional coal tar binder pitch at 165° C. The mix is then extruded at 110° C. to form a 19 mm diameter green electrode. The green electrode is baked to 850° C. and then graphitized in a tube furnace to 3000° C. The coefficient of thermal expansion (CTE) of the electrode is measured using a capacitance method as described in G. Wagoner et al., Carbon Conference 1986 Proceedings, pp. 234, Baden-Baden, 1986. The CTE value over the temperature range of 30-110° C. is determined as 0.038 ppm/° C.

Example 2

In order to illustrate the advantages of the inventive process, a petroleum-derived decant oil used to produce needle coke for graphite electrodes is coked in the same apparatus using the same coking schedule and a pressure of 100 psig. The MCC of the starting decant oil is 8.7%. After coking, a 49% yield of green coke is obtained. Even though the initial MCC value of the decant oil is much higher than that of the coal tar distillate, it provides a substantially lower coke yield. The green coke is calcined giving an overall calcined coke yield of 48%. The CTE evaluation for this coke is carried out identically as above and the CTE is measured as 0.286 ppm/° C.

Example 3

A blend of 80% of the coal tar distillate and 20% of the above decant oil is coked by the same procedure. The yields of raw coke and calcined coke are respectively 72% and 65%. The measured CTE for the electrode produced from this coke is 0.074 ppm/° C. Both the CTE value and the carbon yield are intermediate to those obtained for the original components in the previous examples.

Accordingly, by the practice of the present invention, low CTE graphite electrodes are prepared through a method of transforming coal tar distillate having heretofore unrecognized characteristics. This inventive process directly converts coal-base precursors to highly anisotropic needle coke without the need for solid separations making them readily adaptable to commercial delayed coking systems for the production of graphite electrodes.

The disclosures of all cited patents and publications referred to in this application are incorporated herein by reference.

The above description is intended to enable the person skilled in the art to practice the invention. It is not intended to detail all the possible variations and modifications that will become apparent to the skilled worker upon reading the description. It is intended, however, that all such modifications and variations be included within the scope of the invention that is defined by the following claims. The claims are intended to cover the indicated elements and steps in any arrangement or sequence that is effective to meet the objectives intended for the invention unless the context specifically indicates the contrary.

Thus, although there have been described particular embodiments of the present invention of a new and useful Method of Producing Needle Coke for Low CTE Graphite Electrodes, it is not intended that such references be construed as limitations upon the scope of this invention except as set forth in the following claims.

What is claimed is:

1. A method of creating low coefficient of thermal expansion needle coke, comprising:
    (a) heating a needle coke precursor comprising at least 80% coal tar distillate having a boiling point of greater than 280° C. and substantially free of crushed coal under pressure, thereby converting 60-90% of the coal tar distillate into raw coke; and
    (b) calcining the raw coke to create low coefficient of thermal expansion needle coke.

2. The method of claim 1 further comprising crushing the raw coke of step (a) prior to the calcining of step (b).

3. The method of claim 2 wherein the crushed raw coke of step (b) is calcined to a temperature of from about 1300° C. to about 1500° C.

4. The method of claim 3 further comprising calcining the coal tar distillate of step (b) at a rate of temperature change of about 300° C. per hour to about 400° C. per hour.

5. The method of claim 3 further comprising holding the temperature of step (b) for of from about 20 minutes to about 40 minutes.

6. The method of claim 1 wherein the coal tar distillate has a modified Conradson carbon value of at least about 1%.

7. The method of claim 1 wherein the pressure of step (a) is of from about 20 psig to about 100 psig.

8. The method of claim 7 wherein the pressure is about 50 psig.

9. The method of claim 1 further comprising heating the coal tar distillate of step (a) at a rate of from about 35° C. per hour to about 65° C. per hour.

10. The method of claim 9 further comprising holding the temperature of step (a) for from about 16 hours to about 25 hours.

11. The method of claim 1 further comprising a needle coke yield wherein the yield of needle coke of step (b) is of from about 80% to about 95% of the raw coke.

12. The method of claim 1 further comprising a final production yield wherein the yield of needle coke of step (b) is of from about 55% to about 85% of the coal tar distillate.

13. A method of creating a low coefficient of thermal expansion needle coke, comprising:
 (a) heating a needle coke precursor comprising at least 80% coal tar distillate having a boiling point of greater than 280° C. under pressure, thereby converting 60-90% of the coal tar distillate into raw coke; and
 (b) calcining the raw coke to create low coefficient of thermal expansion needle coke, wherein the method does not include a hydrogenation step.

14. The method of claim 13 wherein the yield of needle coke of step (b) comprises from about 55% to about 85% of the coal tar distillate.

15. The method of claim 13 wherein the yield of needle coke of step (b) is from about 80% to about 95% of the raw coke.

* * * * *